US010896416B2

(12) United States Patent
Rasmussen et al.

(10) Patent No.: US 10,896,416 B2
(45) Date of Patent: Jan. 19, 2021

(54) METHOD AND SYSTEM FOR ONE-TOUCH FUELING AUTHORIZATION

(71) Applicant: Safeway Inc., Pleasanton, CA (US)

(72) Inventors: Carrie Rasmussen, Pleasanton, CA (US); Raj Raghavan, Pleasanton, CA (US); Saju Sreekumar, Pleasanton, CA (US)

(73) Assignee: Safeway Inc., Pleasanton, CA (US)

( * ) Notice: Subject to any disclaimer, the term of this patent is extended or adjusted under 35 U.S.C. 154(b) by 0 days.

(21) Appl. No.: 16/791,287

(22) Filed: Feb. 14, 2020

(65) Prior Publication Data
US 2020/0184452 A1 Jun. 11, 2020

Related U.S. Application Data

(63) Continuation of application No. 15/911,494, filed on Mar. 5, 2018, now Pat. No. 10,607,207.

(51) Int. Cl.
*G06Q 40/00* (2012.01)
*G06Q 20/32* (2012.01)
*G06Q 20/40* (2012.01)
*B67D 7/04* (2010.01)
*G06F 3/0488* (2013.01)
*G06F 3/041* (2006.01)

(52) U.S. Cl.
CPC ............ *G06Q 20/322* (2013.01); *B67D 7/04* (2013.01); *G06F 3/0488* (2013.01); *G06Q 20/4014* (2013.01); *G06Q 40/00* (2013.01); *G06F 3/0416* (2013.01)

(58) Field of Classification Search
CPC .. G06Q 20/322; G06Q 20/4014; G06Q 40/00; B67D 7/04; G06F 3/0488
See application file for complete search history.

(56) References Cited

U.S. PATENT DOCUMENTS

| 10,607,207 | B2 | 3/2020 | Rasmussen et al. | |
|---|---|---|---|---|
| 2005/0102075 | A1* | 5/2005 | Dar | G06Q 40/08 701/31.4 |
| 2007/0084523 | A1* | 4/2007 | McLean | G06Q 30/06 705/400 |
| 2009/0289113 | A1* | 11/2009 | Vilnai | G06Q 20/40 705/41 |

OTHER PUBLICATIONS

Thomas A. Becker, Ikhlaq Sidhu, and Burghardt Tenderich, Electric Vehicles in the United States a New Model with Forecasts to 2030, Aug. 24, 2009, University of California, Berkeley, web, 1-20 (Year: 2009).*
Mastroberte, Tammy, "More & More C-stores Banking on Mobile Payments," Convenience Store News, Aug. 21, 2017, https://csnews.com/more-more-c-stores-banking-mobile-payments, 4 pages.
Becker, Thomas A., et al., "Electric Vehicles in the Unites States A New Model with Forecasts to 2030," Aug. 24, 2009, University of California, Berkeley, 36 pages.

* cited by examiner

*Primary Examiner* — I Jung Liu
(74) *Attorney, Agent, or Firm* — Conley Rose, P.C.; Rodney B. Carroll

(57) ABSTRACT

Embodiments of a method and a cloud-assisted fueling system for one-touch fueling authorization are disclosed.

20 Claims, 3 Drawing Sheets

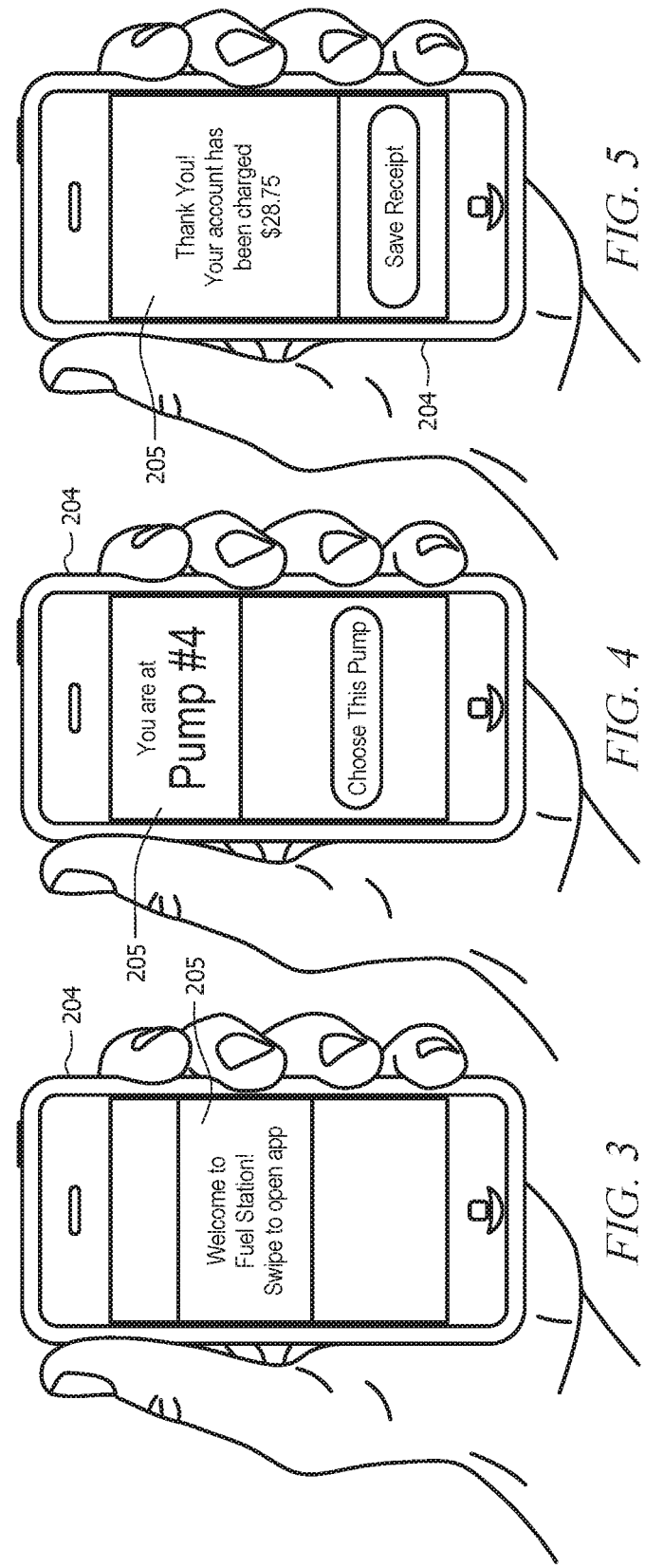

METHOD AND SYSTEM FOR ONE-TOUCH FUELING AUTHORIZATION

CROSS-REFERENCE TO RELATED APPLICATIONS

This application is a continuation of and claims priority to U.S. patent application Ser. No. 15/911,494 filed on Mar. 5, 2018, published as U.S. Patent Application Publication No. 2019/0272524 A1, and entitled "Method and System for One-Touch Fueling Authorization," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Current fueling methods require customers to conduct a multitude of steps to complete the task of fueling a vehicle at a gas station. For example, when a customer arrives at a pump at a gas station, the customer must retrieve his/her payment card, exit the vehicle, swipe the payment card, verify any loyalty/reward membership, select whether the payment card is debit or credit, enter payment card security information on a keypad, wait for authorization, choose to use any available rewards, and select a fuel grade; all before being able to pump fuel into the fuel tank. Moreover, when fueling is finished, the customer must select 'yes" for a receipt, and wait for a receipt to be printed; or as often occurs, "see the cashier" if a receipt is desired.

The time it takes to complete the steps needed in order to begin pumping fuel is about 1 to 1.5 minutes. The time waiting for or obtaining a receipt is in addition to the 1 to 1.5 minutes. Thus, there is a need to reduce the total amount of time a customer spends fueling a vehicle.

SUMMARY

Embodiments of a method and a cloud-assisted fueling system for one-touch fueling authorization are disclosed.

The method for fueling at a gas station can include receiving, by a cloud computing system, an authorization message for fueling a vehicle from a device of a customer, wherein the authorization message contains a customer identifier unique to the customer, a payment token unique to a payment card or a payment account of the customer and unique to the device, a gas station identifier, and a fuel pump identifier; sending, by the cloud computing system, a pre-authorization message to a payment provider, wherein the pre-authorization message contains the payment token; receiving, by the cloud computing system, a pre-authorization confirmation message from the payment provider, wherein the pre-authorization confirmation contains an authorization to use the payment card or the payment account of the customer for payment of the fueling; sending, by the cloud computing system, a fuel authorization request message to an on-site computer at the gas station via a gateway, wherein the fuel authorization request message contains the customer identifier, the gas station identifier, the fuel pump identifier, and an authorization to pump fuel at a fuel pump at the gas station corresponding to the pump identifier; and in response to receiving the fuel authorization request message, pumping fuel at the fuel pump.

The cloud-assisted fueling system can include a cloud computing system, wherein the cloud computing system is networked to an on-site computer located at a gas station via a gateway, wherein the cloud computing system is configured to: receive an authorization message for fueling a vehicle from a device of a customer, wherein the authorization message contains a customer identifier unique to the customer, a payment token unique to a payment card or a payment account of the customer and unique to the device, a gas station identifier, and a fuel pump identifier; send a pre-authorization message to a payment provider, wherein the pre-authorization message contains the payment token; receive a pre-authorization confirmation message from the payment provider, wherein the pre-authorization confirmation contains an authorization to use the payment card or the payment account of the customer for payment of the fueling; and send a fuel authorization request message to the on-site computer via the gateway, wherein the fuel authorization request message contains the customer identifier, the gas station identifier, the fuel pump identifier, and an authorization to pump fuel at a fuel pump corresponding to the pump identifier;

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 3, 4, and 5 are screenshots from a customer's device, illustrating the fueling method from the customer's perspective.

DETAILED DESCRIPTION

Figure 1:
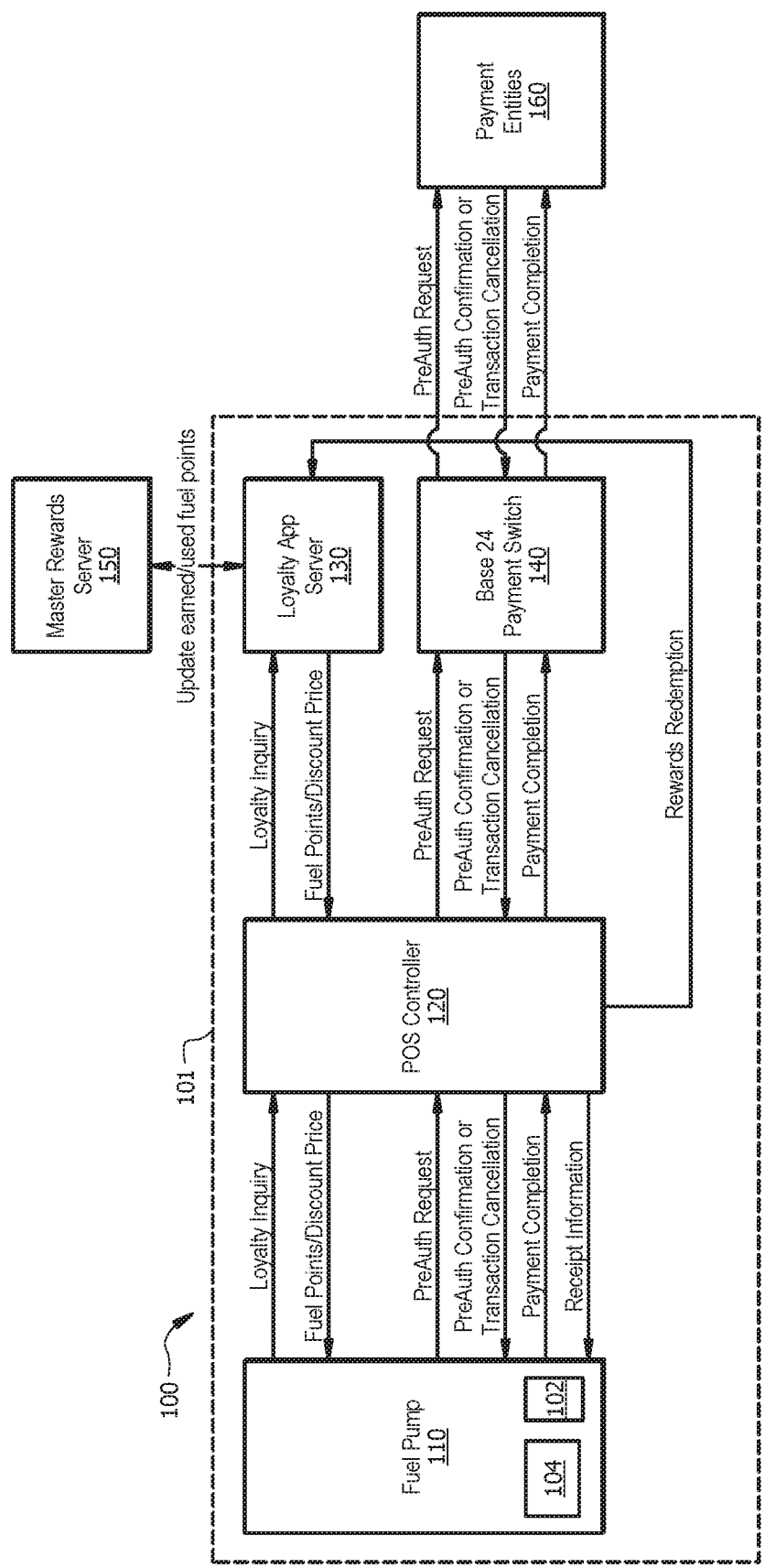
FIG. 1 is schematic diagram of a conventional fueling system.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The disclosed embodiments of the fueling method and system shift certain aspects of data input and processing for fueling a vehicle from a gas station to the cloud. The interaction between the customer and fuel pump is changed from an interface at the fuel pump to a customer's device and a cloud computing system. For example, communication technology to determine loyalty status of a customer at the fuel pump is changed from gas station-based serial communications between the fuel pumps and the loyalty app server, to on-demand network access to a shared pool of configurable computing resources (e.g., a cloud computing system can communicate with a customer's smartphone and an on-site computer at the gas station). Moreover, the communication technology to pay for the fuel is changed from a POS controller/BASE24 payment switch device combination to a cloud-based fuel application which utilizes online payment solutions via the disclosed payment provider.

By changing technology in one or more of the aspects above, vehicle fueling is improved because faster processing time is achieved using a combination of computing components disclosed herein. Further, the change in technology offered by the embodiments of the disclosed system and method reduce data load and data communications traffic on system components (e.g., the POS controller and loyalty app server, discussed below), which results in a fueling method and system which is faster than conventional methods and systems. These improvements are magnified when operating the system and method for hundreds if not thousands of fuel pumps at the same time, such as is the case for merchants of fuel, including grocery merchants who have gas stations in tandem with the grocery store.

The faster processing speed, reduced data load, and reduced traffic also result in a reduced amount of time a customer spends fueling a vehicle. Further, embodiments of the system and method need only one input from the customer (i.e., "one-touch technology") to authorize fueling. For example, and described in more detail below, embodiments of the disclosed system and method can operate such that the customer is presented with one request for input on the customer's device as to whether fueling should be authorized at the fuel pump, instead of multiple inputs at the fuel pump itself.

Another improvement provided by the embodiments of the disclosed system and method is that the gas station can provide both conventional and the disclosed techniques to a customer for refueling their vehicle. That is, the customer can choose whether to process payment according to the method shown in FIG. 1 or the method shown in FIG. 2. Or, after attempting to use the faster method of FIG. 2, a customer who experiences a problem can attempt to use the method of FIG. 1.

As used herein, the term "beacon" refers to a device which emits a directional signal using short range communication technology, such as Bluetooth or Near Field Communication (NFC). An example of such device is the a Bluetooth® Low Energy (LE) Beacon manufactured by Footmarks®.

As used herein, the term "cloud", "cloud computing system", "cloud-based", and like terms refer to the hardware and software computing components which operate in cloud computing. The definition for "cloud computing" as set forth by the National Institute of Standards and Technology for the U.S. Department of Commerce includes a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

As used herein, the term "device of the customer" refers to a mobile phone (e.g., smartphone), tablet, on-board computer in the vehicle, or other device, which has short range communication technology, such as Bluetooth or Near Field Communication (NFC). The "device of the customer" has processing and data storage capability for running the one-touch fueling authorization application.

As used herein, the term "gateway" refers to hardware and/or software which has a physical, virtual, cloud, Linux, or Docker form factor. In some embodiments, the gateway is cloud-based, and in further embodiments, the cloud-based gateway can be a part of the cloud computing system. An example of a gateway suitable for use with the disclosure is the IBM® DATAPOWER® Gateway.

As used herein, the term "payment provider" refers to the hardware and software computing components which function to provide payment processing for cloud-based computing systems. An example of such a provider includes the payment processing solutions provided by FIRSTDATA®.

As used herein, the term "on-site computer" is a computer device having computer components which is local to the gas station. The "on-site computer" has the ability to process data, send/receive data, and network with the gateway, POS controller, and pump controller(s), via at least two different network communication technologies.

For clarity, the conventional and disclosed methods and systems will be described using a scenario where a single customer arrives at a gas station for fueling a vehicle, for clarity. However, it should be understood that the methods and systems simultaneously handle large numbers of customer interactions for fueling vehicles at the many fuel pumps administered by a merchant.

A conventional fueling system 100 is shown in FIG. 1. The conventional system 100 includes a fuel pump 110, a point of sale (POS) controller 120, a loyalty app server 130, a BASE24 payment switch 140, a master rewards server 150, and payment entities 160. The components of the system 100 are linked or networked with at least one other component as shown in FIG. 1: the fuel pump 110 is networked the POS controller 120; the POS controller 120 is additionally networked with the loyalty app server 130 and with the BASE24 payment switch 140; the loyalty app server 130 is additionally networked with the master rewards server 150; and the BASE24 payment switch 140 is additionally networked with the payment entities 160. Each of the components 110, 120, 130, 140, 150, and 160 of the conventional system 100 can be embodied with computer equipment such as one or more processors, memory, networking cards, and other equipment for processing data (e.g., sending/receiving messages containing data) associated with fueling vehicles at the merchant premises 101.

Most of the components of the conventional system 100 (e.g., components 110, 120, 130, and 140) are located on-site at a merchant's merchant premises 101. The merchant premises 101 can be those typically known which have fuel pumps numbered from 1 to N, where N is the total number of fuel pumps at the merchant premises 101. The fuel pumps are each fluidly connected to a fuel reservoir for each grade or type of fuel that can be administered to a vehicle at the fuel pumps. Each fuel pump, e.g., fuel pump 110, has a nozzle which mates with a port on the vehicle for fueling the vehicle. Each fuel pump also can have buttons to select the fuel grade or type of fuel to be administered and a customer interface (explained in more detail below) for paying for the fuel. The fuel pumps can be located under a roofing structure which protects the fuel pumps and customers from weather. Each fuel pump, including fuel pump 110, is networked with the POS controller 120. Thus, in the conventional system 100, the POS controller 120, the loyalty app server 130, and the BASE24 payment switch 140 each perform their respective functions for each of the number (N) of fuel pumps at the merchant premises 101.

The master rewards server 150 can be located off-site at a central location for centralized tracking of loyalty member fuel points accumulated or redeemed at a number of gas stations included in one or more merchant premises 101. The payment entities 160 can be located offsite and are typical entities having equipment and payment networks for processing payment transactions (e.g., computer equipment of an acquiring bank, issuing bank, processing entity, a VISA® payment processing network, for example). In embodiments where the merchant is a grocer, the merchant premises 101 is likely a structure having the fuel pump 110 which is located proximate to the grocery store. For grocer merchants, the loyalty app server 130 can be located in the grocery store, or alternatively, the loyalty app server 130 can be located at the structure having the fuel pump 110.

When a customer arrives at the fuel pump 110 at a merchant premises 101, the customer must retrieve his/her payment card, exit the vehicle, and interact with the fuel pump 110 to authorize the flow of fuel. The fuel pump 110 has a card reader 102 by which the customer can enter payment information (e.g., insert or swipe of a credit card, debit card, merchant rewards/loyalty card, or a combination thereof; referred to herein as a "card"). Other payment recognition technology exists in addition to or in place of the card reader 102, such as the key tag or other device intended to replace the card. However, conventional payment recognition technology depends on processing of information by system components at the merchant premises 101.

The fuel pump 110 also has a user interface such as a keypad/display or touchscreen 104 which displays various commands for gathering customer information. For example, the fuel pump 110 can instruct a customer, via the keypad/display or touchscreen 104, to swipe a card. The fuel pump 110 then can ask for, again via keypad/display or touchscreen 104, an authorization or a security code, such as a PIN number or zip code associated with the card. At various points in the data gathering steps, the fuel pump 110 can ask for loyalty/rewards input. For example, the fuel pump 110 via the keypad/display or touchscreen 104 can ask the customer to swipe a loyalty card in the card reader 102 or otherwise input information (e.g., a telephone number associated with a loyalty account) via the keypad/display or touchscreen 104 which would identify the customer as a member of the merchant's loyalty/rewards program. The customer can enter loyalty/rewards information via the keypad/display or touchscreen 104, or a customer may choose not to (e.g., not a member, forgot their loyalty/rewards information, does not have their loyalty/rewards card to initiate identification as a loyalty/rewards member, etc.).

The labeled arrows in FIG. 1 show the fuel pump 110 interacts with the POS controller 120 for a loyalty inquiry and a pre-authorization request. Although, if a customer is not identified as a member of a loyalty/rewards program, then the fuel pump 110 does not interact with the POS controller 120 for a loyalty inquiry. The POS controller 120 typically is a single controller which is networked with each of the fuel pumps, including fuel pump 110, at the merchant premises 101.

If the fuel pump 110 receives loyalty/reward information from the customer, the fuel pump 110 sends a message containing the loyalty/reward information to the POS controller 120 as the loyalty inquiry. The loyalty inquiry may also identify the pump number associated with the particular loyalty inquiry. The POS controller 120 forwards the loyalty inquiry to the loyalty app server 130. The loyalty app server 130 is on-site with the POS controller 120 and fuel pump 110, either in the grocery store or at the structure having the fuel pump 110. The loyalty app server 130 communicates with the master rewards server 150 to reconcile whether the loyalty information is associated with a loyalty account and if so, to determine the amount of available rewards (e.g., in the form a discount on the price of the fuel) for the customer. The loyalty app server 130 then sends a message to the POS controller 120 regarding any available rewards and verifying the customer is a loyalty/rewards customer, and the POS controller 120 associates the message with the pump number and sends the message regarding any available rewards and verifying the customer is a loyalty/rewards customer to the fuel pump 110.

For the pre-authorization request, the fuel pump 110 sends the payment information received via customer input at the fuel pump 110 to the POS controller 120. The POS controller 120 forwards the pre-authorization request to the BASE24 payment switch 140. The BASE24 payment switch 140 routes the pre-authorization through the appropriate payment network to the appropriate payment entity 160 which can determine whether or not to authorize the payment card/account, for payment of the fuel which will be dispensed at the fuel pump 110.

If pre-authorization is confirmed, the appropriate payment entity of the payment entities 160 sends a message containing a pre-authorization confirmation to the payment switch 140 which then sends the message to the POS controller 120, which subsequently sends the message to the fuel pump 110. In response to a pre-authorization confirmation message, the fuel pump 110 can instruct the customer via keypad/display or touchscreen 104 to select a fuel grade and remove the nozzle from the nozzle holder of the fuel pump 110.

If pre-authorization is not confirmed, the appropriate payment entity of the payment entities 160 sends a message containing a transaction cancellation to the switch 140 which then sends the message to the POS controller 120, which subsequently sends the message to the fuel pump 110. In response to a transaction cancellation message, the fuel pump 110 then can indicate via the keypad/display or touchscreen 104 the transaction is canceled (e.g., problem with the card, the security code, or the fuel pump 110).

Except for the communications of the loyalty app server 130 with the master rewards server 150, and for the communications of the payment switch 140 with the payment entities 160, the fueling method up to this point takes place on site at the merchant premises 101. The fuel pump 110 and the other pumps at the merchant premises 101 are typically serially connected for communication with the loyalty app server 130 and payment switch 140 via the POS controller 120 such that only one message is transmitted at a time. This creates network congestion because during heavy use of the merchant premises 101 there may be at any point in time multiple messages from multiple fuel pumps in need of transmission. The serial connection allows messages to be transmitted and received only serially, i.e., one at a time, and during high traffic periods with many messages, the send/receive time slows like a bottleneck in automobile traffic when cars at rush hour need to pass through a one lane road in both directions.

After pre-authorization, a customer refuels a vehicle with the chosen fuel grade or type. The time period for physically fueling depends on pump speed, the amount of static head in the fuel reservoir, customer actions, etc.

After the vehicle is refueled, the customer replaces the fuel nozzle on the fuel pump 110. The fuel pump 110 determines fueling is complete, and prompts the customer via the keypad/display or touchscreen 104 whether a receipt is desired, yes or no, Y/N. In some instances, the fuel pump 110 does not prompt the customer and automatically prints a receipt. If the customer indicates a receipt is wanted, e.g., via a "yes" button, or if the fuel pump 110 automatically prints a receipt, the fuel pump 110 prints the receipt indicating the total price paid for the fuel. If no receipt is indicated, the fuel pump 110 may not print a receipt. In some instances, the fuel pump 110, via the keypad/display or touchscreen 104, instructs the customer to "see the cashier" for a receipt.

After the fuel pump 110 determines fueling is complete, the amount to be charged to the customer is sent as a message for payment completion to the POS controller 120. The POS controller 120 forwards the message to the payment switch 140, which then communicates the message of payment completion to the payment entities 160 for payment reconciliation according to known techniques. The POS controller 120 records the sale and writes the sale data to the loyalty app server 130.

Figure 2:
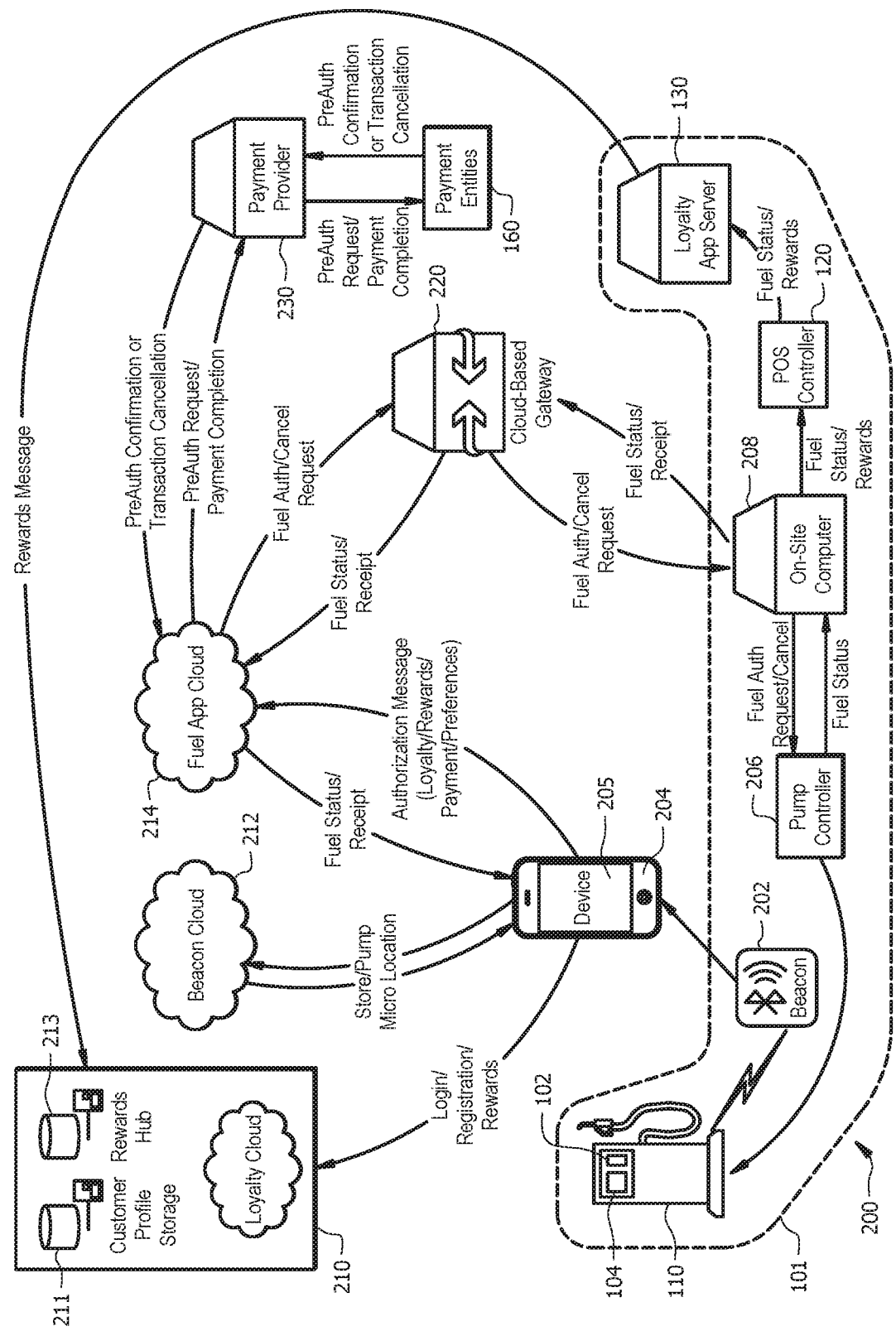
FIG. 2 is a schematic diagram of the disclosed fueling system.

FIG. 2 illustrates the inventive system 200 for fueling a vehicle, and the inventive methods associated therewith. Conventional components remain in the system 200, for example, the fuel pump 110, the POS controller 120, and the loyalty app server 130. Conventional payment entities 160 are also utilized for backend payment processing. The inventive system 200 uses other components, namely, a beacon 202 in proximity of the fuel pump 110 to communicate with a device 204 of a customer, a pump controller 206, an on-site computer 208, a cloud computing system (e.g., having one or more of a loyalty cloud 210, a beacon cloud 212, a fuel application cloud 214), a gateway 220, and a payment provider 230. The scope of system 200 in this disclosure can include any combination of the components 110, 120, 130, 160, 202, 204, 210, 212, 214, 220, and 230 shown in FIG. 2. The pump controller 206 can be the second pump controller on-site for a given pump, since legacy hardware can include the original pump controller in the existing fuel pump 110. In embodiments, the pump controller 206 is placed internally of the fuel pump 110; alternatively, on-site at the merchant premises 101 external of the fuel pump 110. The on-site computer 208 is in addition to any computing devices already present on-site at the merchant premises 101 before modification to accommodate the fueling application disclosed herein; alternatively, existing computer devices can be loaded with software functionality for the on-site computer 208.

Components of the system 200 which are on-site at the merchant premises 101 (indicated by the dashed line) are the fuel pump 110, the beacon 202, the pump controller 206, the on-site computer 208, the POS controller 120, and the loyalty app server 130. It is contemplated that the system 200 includes a dedicated beacon 202 for each fuel pump 110 at the merchant premises 101.

The components of the system 200 are linked or networked with at least one other component as shown in FIG. 2: the beacon 202 is networked to the device 204 of the customer; the device 204 is additionally networked with the loyalty cloud 210, the beacon cloud 212, and the fuel application cloud 214; the loyalty cloud 210 is additionally networked with the loyalty app server 130 and the fuel application cloud 214; the fuel application cloud 214 is additionally networked with the gateway 220 and the payment provider 230; the payment provider 230 is additionally networked with the payment entities 160; the gateway 220 is additionally networked with the on-site computer 208; the on-site computer 208 is additionally networked with the pump controller 206 and the POS controller 120; the POS controller 120 is additionally networked with the loyalty app server 130; and the pump controller 206 is additionally networked with the fuel pump 110. Each of the components 110, 120, 130, 160, 202, 204, 210, 212, 214, 220, and 230 shown in FIG. 2 can be embodied with computer equipment such as one or more processors, memory, networking cards, and other equipment for processing data (e.g., sending/receiving messages containing data) associated with fueling vehicles at the merchant premises 101.

Regarding network communication technology, the loyalty app server 130 can be networked with the Loyalty cloud computing system 210 via a secure internet connection and with the POS controller 120 via a wired intranet connection. The on-site computer 208 can be networked to the fuel pump 110 via serial network connection. The on-site computer 208 can additionally be networked with the POS controller 120 via a wired intranet connection.

The system 200 communicates with a device 204 of a customer to achieve the various benefits of this disclosure. The device 204 has short range communication technology, such as Bluetooth or Near Field Communication (NFC), to communicate with the beacon 202. In an embodiment, the beacon 202 and the device 204 have the same short range communication technology. The device 204 can be capable of storing and running a one-touch fueling authorization application. The one-touch fueling authorization application can be downloaded to the device 204 and can run in the background of the device 204 for use when fueling a vehicle at the merchant premises 101 utilizing the system 200. For customer interaction with the application, the device 204 can have a display 205.

The one-touch fueling authorization application can give the device 204 the necessary functionality to communicate with the beacon 202 and one or more of the clouds 210, 212, and 214. Clouds 210, 212, and 214 can be collectively referred to as a cloud computing system.

Prior to fueling, the customer can establish a customer profile with the merchant, for example, using the one-touch fueling authorization application running on the device 204. The customer profile can include a login (username, password), and any other information such as phone number, street address, email address, an amount of rewards/points earned, an amount of rewards/points redeemed, information associated with a card (e.g., credit card or debit card) of the customer, or a combination thereof. The customer can indicate the preferred payment card/account for fueling, such as GOOGLE PAY®, APPLE PAY®, VISA®, MASTERCARD®, DISCOVER®, AMERICAN EXPRESS®, etc. Payment information for each payment card/account is entered one time into the application, for example, card number, zip code, PIN code, expiration date or combinations thereof. The customer can also indicate in the application the method by which to receive a receipt, e.g., via email, text, or paper at the merchant premises 101.

The device 204 can send the customer profile to the loyalty cloud 210, where the customer profile can be stored in the customer profile storage 211 on the loyalty cloud 210. Additionally or alternatively, the customer profile can be stored in a memory of the device 204. It is contemplated that all or a portion of the customer profile can be synced between the device 204 and the loyalty cloud 210 so that customer information is updated in both locations, in real time.

In an embodiment, the customer is already a loyalty member of the merchant and can have previously established a loyalty account and can have previously been assigned a customer identifier by the merchant. The customer identifier can be a multi-digit (e.g., 1, 2, 3, 4, 5, 6, 7, 8, 9, 10, 11, or 12 digits) number, for example. It is contemplated that the customer identifier can be any identifier known in the art for purposes of identifying the customer for the purposes disclosed herein. The application can cause the device 204 to prompt the customer to enter a customer identifier (e.g., via the display 205 of the device 204, via audible input with a microphone, via face recognition, retina scan, fingerprint recognition, or a combination thereof). This can occur at any point, e.g., before input of customer profile information, after input of customer profile information, during input of customer profile information.

In the case where the customer has not yet become a loyalty member of the merchant of the merchant premises 101, the application on the device 204 can send a customer identifier request message requesting a new customer identifier to the loyalty cloud 210. In response to this request message, the loyalty cloud 210 can create a loyalty account for the customer profile, create a customer identifier which is unique to the customer for the loyalty account, and can send the customer identifier to the device 204.

In either case, the application on the device 204 can associate the customer profile with the customer's customer identifier; alternatively, this can be performed by the loyalty cloud 210; alternatively, both the application on the device 204 and the loyalty cloud 210 can associate the customer profile with the customer identifier.

After receiving the payment information, a token will be created by the payment provider 230, and will be stored in the customer device 204. The token digitally represents the unique combination of a payment card/account and the device 204. Thus, only using the token with the authorized device 204 will result in authorization of fueling with the one-touch fueling authorization application. A token can be created for each payment card/account, by doing this customer payment number will be protected from any exploitation. The token can be communicated to the fuel application cloud 214, and the fuel application cloud 214 can transmit the token to the payment provider 230 for storage in a memory thereof. As is discussed in more detail below, storage of the token by the payment provider 230 and in the device 204 allows the device 204 to send the token in an authorization message while allowing verification that the token stored by the payment provider 230 and the token stored in the device 204 is the same, by determining the token received from the device 204 and the stored token are the same and that both tokens associate the same payment card/account with the device 204.

The beacon 202 is a directional signal device associated to the particular fuel pump 110. The association of the beacon 202 with the fuel pump 110 can be made at the beacon 202; or alternatively, the association can be made in the beacon cloud 212 (described below). Each beacon in the merchant premises 101 is associated with only one fuel pump; thus, the system 200 can include one dedicated beacon for every fuel pump at the merchant premises 101.

When a customer arrives at the fuel pump 110 at the merchant premises 101 (presumably in their vehicle), the application running on the device 204 can sense the beacon 202. Alternatively, a push notification can be sent when the device 204 comes with range of the beacon 202 and in the direction of the beacon signal. Before sensing or sending of the push notification, the beacon 202 and the device 204 can connect/pair via the short range communication technology. After pairing, the device 204 can obtain the number or other identifier for the fuel pump 110 from the beacon 202. Alternatively, the device 204 can obtain an identifier related to the beacon 202, and the beacon identifier can be associated with the fuel pump 110 in the beacon cloud 212.

The application on the device 204 then causes the device 204 to communicate with clouds 210, 212, and 214, as described below. The device 204 can use a network, such as cellular, mobile, or satellite networks for mobile device communications to communicate with the loyalty cloud 210, the beacon cloud 212, the fuel application cloud 214, or a combination thereof. The networks used for communication between the device 204 and the clouds 210, 212, and 214 can include Global System for Mobile Communications (GSM), Code-division multiple access (CDMA), General Packet Radio Service (GPRS), Evolution-Data Optimized (EV-DO), Enhanced Data Rates for GSM Evolution (EDGE), Universal Mobile Telecommunications System (UMTS), etc.

While clouds 210, 212, and 214 are shown in FIG. 2 as separate clouds, it is contemplated that any combination of clouds 210, 212, and 214 can be embodied on cloud-based networks, servers, storage, applications, services, or combinations thereof at a single location or at multiple locations. It is further contemplated that any of clouds 210, 212, and 214 can be distributed among networks, servers, storage, applications, services, or combinations thereof at multiple locations.

The device, 204, running the one-touch fueling authorization application, can send the number or other identifier for the fuel pump 110, the beacon 202, or both, previously received from the beacon 202, to the beacon cloud 212. The beacon cloud 212 can determine the number of the fuel pump 110 associated with the beacon 202, and can optionally additionally determine the location or identifier of the merchant premises 101. The identification of the location via the fuel pump 110 and/or the merchant premises 101 can be referred to herein as determining the micro-location of the device 204. The beacon cloud 212 then can send a message containing micro-location information to the application running on the device 204. The micro-location information can include a pump identifier (e.g., the pump number) for the fuel pump 110, and optionally the identifier for the merchant premises 101. The application on the device 204 can use the micro-location information when communicating with the fuel application cloud 214.

As discussed above, it is contemplated the application can prompt the customer on the device 204 to enter a customer identifier, such as a loyalty card number or a photo of a loyalty card, prior to sending the authorization message. Alternatively, it is contemplated that the application running on the device 204 can have the customer identifier (previously having been entered to setup or login to the application) stored on the device 204.

The disclosed system 200 and method implemented therein uses the device 204 to communicate with the fuel application cloud 214 for loyalty inquiry, authorization for fueling, fuel status, and receipts.

The application can cause the device 204 to communicate a single authorization message to the fuel application cloud 214. The authorization message can contain information similar to the loyalty inquiry and the authorization inquiry discussed for the conventional system 100.

The application can cause the device 204 to send the customer identifier in the authorization message to the fuel application cloud 214. The fuel application cloud 214 can store (at least temporarily) the customer identifier for subsequent use to identify and validate the identity of the customer for payment completion after fueling is complete, as is discussed below.

The fuel application cloud 214 can use the customer identifier to confirm the customer has a loyalty account registered in the merchant's loyalty cloud 210, e.g., stored in the rewards hub 213. The authorization message from the device 204 to the fuel application cloud 214 can also request any reward/discount available to the customer (e.g., a discount associated with the customer identifier) for fueling the vehicle. The fuel application cloud 214 can send a message containing the customer identifier to the loyalty cloud 210 regarding the loyalty inquiry. The loyalty cloud 210 can determine, using the rewards hub 213, whether or not the customer has any reward/discount available for fueling. The loyalty cloud 210 then can send a message to the fuel application cloud 214 containing any discount available for fueling which is associated with the customer identifier, or a message that indicates no discount is available.

In an embodiment, the fuel application cloud 214 can send a message to the device 204 regarding the discount. The application on the device 204 can indicate to the customer on the display 205 of the device 204 the discount available and prompt the customer whether to use the discount or not. The customer can select, via one or more actual and/or virtual buttons on the display 205 of the device 204 whether to use the reward/discount. The selection is communicated from the device 204 to the fuel application cloud 214. In another embodiment, the fuel application cloud 214 does not ask the customer whether a discount is to be applied, and automatically associates a discount with the fueling.

The authorization message from the device 204 to the fuel application cloud 214 can also contain the micro-location information obtained from the beacon cloud 212, the token for payment, and the preferred method for receiving a receipt.

In response to receipt of the authorization message, the fuel application cloud 214 then can communicate a pre-authorization message to the payment provider 230 for pre-authorization of payment. The pre-authorization message can contain the token received from the customer device 204. The payment provider 230 then can determine the token received from the fuel application cloud 214 matches the token which is stored by the payment provider 230. The payment provider then can create and send a pre-authorization message to the appropriate payment entity of the payment entities 160 associated with the payment card/account which is digitally represented by the token. The pre-authorization message can contain information for the appropriate payment card/account which is recognizable by the payment provider 230. The payment provider 230 then can send the pre-authorization message to the appropriate payment entity of the payment entities 160 associated with the payment card/account. The payment entity of the payment entities 160 then can determine whether or not to authorize the payment card/account, for payment of the fuel which will be dispensed at the fuel pump 110.

If pre-authorization is confirmed, the payment entity of the payment entities 160 can send a pre-authorization confirmation message containing a pre-authorization confirmation to the payment provider 230, which then sends the message to the fuel application cloud 214. The fuel application cloud 214 subsequently can send a fuel authorization request message to the gateway 220. The fuel authorization request message can contain the customer identifier, the micro-location information regarding the particular merchant premises 101 and identity of the fuel pump 110 from which fuel should be dispensed, along with an authorization to pump fuel at the fuel pump 110. The gateway 220 can determine that the merchant premises 101 is the intended recipient of the fuel authorization, and subsequently can forward the fuel authorization request message to the on-site computer 208 at the merchant premises 101.

In response to receiving the fuel authorization request message, the fuel pump 110 can pump fuel. To do this, the on-site computer 208 at the merchant premises 101 can analyze the micro-location information and authorization contained in the fuel authorization request message, and consequently can instruct the pump controller 206 to activate the specific fuel pump 110 where the customer is located. The pump controller 206 can then activate the fuel pump 110 to pump fuel. In an embodiment, the fuel pump 110 can instruct the customer via keypad/display or touchscreen 104 (or other input buttons) to select a fuel grade and/or fuel type, and remove the nozzle from the nozzle holder of the fuel pump 110. In another embodiment, the fuel grade and/or fuel type is received in the fuel authorization request message and transmitted to the pump 110 by the pump controller 206, and the pump 110 can then automatically pump the received fuel type and/or grade. The on-site computer 208 can use the customer identifier for subsequent communication with the POS controller 120 and gateway 220, as described below.

If pre-authorization is not confirmed, the payment entity of the payment entities 160 can send a cancellation message to cancel the transaction to the fuel application cloud 214, and the cancellation message then can be sent through the chain of the gateway 220, the on-site computer 208, the pump controller 206, and the fuel pump 110. In response to a transaction cancellation message, the fuel pump 110 then can indicate via the keypad/display or touchscreen 104 the transaction is canceled (e.g., due to a problem with the card, the security code, etc.).

After fueling, the customer can return the fuel nozzle to the nozzle holder. The pump controller 206 can determine that fueling is complete at the fuel pump 110 and can send a fuel status message to the on-site computer 208. The fuel status message indicates that fueling is complete. The on-site computer 208 can receive the fuel status message, and then can use the customer identifier previously received from the gateway 220 in the fuel authorization request message to create a fuel status/receipt message. In this aspect, the on-site computer 208 can store, at least temporarily, the micro-location information and/or customer identifier associated with the fuel authorization for later use with the fuel status/receipt message. The fuel status/receipt message can include the micro-location information, the customer identifier, the amount owed for the dispensed fuel (e.g., calculated accounting for any discount available to the customer), and a digital receipt containing the same information as a paper receipt. The on-site computer 208 then can send the fuel status/receipt message to the gateway 220, and the gateway then can send the fuel status/receipt message to the fuel application cloud 214.

The fuel application cloud 214 can analyze the fuel status/receipt message. For example, the fuel application cloud 214 can use the customer identifier and/or the micro-location information contained in the fuel status/receipt message to determine which customer should pay for the fueling. In this aspect, the fuel application cloud 214 can previously have associated the customer identifier with the micro-location information, and can previously have stored information representative of the association for use when the customer identifier and/or micro-location information is received in the fuel status/receipt message from the gateway 220. The fuel application cloud 214, after analysis of the fuel status/receipt message, can determine the fuel status is complete (i.e., the customer has completed refueling the vehicle) and then can send a payment completion message to the payment provider 230. The payment completion message can include the token initially received from the device 204 or some other information representative of the customer's payment card/account. The payment completion message can also include instruction that payment completion should proceed and instruction of the actual payment due (in contrast to a pre-authorized amount) for the fueling. The payment provider 230 then can send the payment completion message requesting payment completion to the payment entities 160 for payment reconciliation according to known techniques.

The fuel application cloud 214 can additionally use the customer identifier and/or the micro-location information contained in the fuel status/receipt message to determine which customer to send the digital receipt. The fuel application cloud 214, after analysis of the fuel status/receipt message, can identify which customer should receive the receipt based on the customer identifier. In this aspect, the fuel application cloud 214 can have previously stored (at least temporarily) the preferred method for receiving a receipt containing the authorization message received by the fuel application cloud 214 from the device 204. The fuel application cloud 214 can identify the customer's preferred method, if any for receiving the digital receipt contained in the fuel status/receipt message. The fuel application cloud 214 then can send the digital receipt to the customer, if a receipt is desired, for example, to the customer's email address, to the customer's device 204 via the application, to the customer's device 204 via text message, or a combination thereof.

The customer's receiving of the receipt can be a suitable notification that the transaction for fueling is complete. Additionally or alternatively, the application running on the device 204 of the customer can activate a notification that the transaction is complete.

The on-site computer 208 can create a fuel status/rewards message and can send it to the POS controller 120. Recall that the on-site computer 208 receives the customer identifier and micro-location information for the customer in the fuel authorization request message from the gateway 220, and the on-site computer 208 receives the fuel status in the fuel status message received from the pump controller 206. The on-site computer 208 can associate the customer identifier, micro-location information, and the fuel status to create a fuel status/rewards message. The fuel status/rewards message created by the on-site computer 208 can include the customer identifier, along with the micro-location information, the amount owed for the dispensed fuel (e.g., calculated accounting for any discount available to the customer), and any rewards available to and/or used by the customer for the fueling.

The on-site computer 208 can send the fuel status/rewards message to the POS controller 120. The POS controller 120 can record the sale and can write the sale data to the loyalty app server 130. The loyalty app server 130 can send a rewards message to the loyalty cloud 210. The rewards message can contain information regarding any rewards available to and/or used by the customer for the fueling. The loyalty cloud 210 can receive and process the rewards message to credit and/or debit rewards for the appropriate loyalty account according to the customer identifier in the message using the rewards hub 213. The loyalty app server 130 and the rewards hub 213 on the loyalty cloud 210 are configured to sync in real time.

It is contemplated that the conventional system 100 can be retrofitted with the components of the disclosed system 200 such that a customer can fuel and pay for fuel by a traditional method or by the disclosed method. That is, the fuel pump 110 can be equipped with a keypad/display and/or touch-screen 104 and card reader 102 and the component networking to accept traditional payment, and the display 204 can also accommodate for any communications at the fuel pump 110 necessary for the disclosed one-touch fueling authorization application. If a customer chooses to use the conventional method of using the card reader 102, the fuel pump 110 in FIG. 2 can communicate a pre-authorization request and any loyalty inquiry directly to the POS controller 120 as described for the conventional system 100 in FIG. 1. The flow of communication between components can be the same as FIG. 1 and is not repeated here.

FIGS. 3, 4, and 5 are screenshots from a customer's device 204, illustrating the fueling method from the customer's perspective.

In FIG. 3, the display 205 of the device 204 shows the cover screen of the application. The customer can access the application by swiping the display 205. It is contemplated other access protocol unique to the type/brand of the device 204 can be used to access the application. This cover screen is an optional feature of the application, and it is contemplated the application can automatically open to the screen shown in FIG. 4.

In FIG. 4, the push notification from the beacon 202 is displayed on the device 204. As can be seen in the display 205 of the device 204, the pump number ("Pump #4") is indicated in the push notification and other optional location specific info such as name/address of the merchant premises 101. It also contemplated that an available discount can additionally be displayed in the push notification. Alternatively, a separate screen can be used to notify the customer of the available discount for the fueling. It is further contemplated that an entry field for entry of the customer's customer identifier can also be displayed in the push notification. Alternatively, a separate screen can be used to receive input for the customer identifier; or alternatively, the system 200 can also have the customer identifier stored (e.g., on the device 204, the fuel application cloud 214, the loyalty cloud 210) such that the customer does not have to enter the customer identifier each time fueling is desired.

In FIG. 4, a virtual button labeled "Choose this Pump" is displayed. The customer can select the pump for fueling by touching the display 205 in the area of the virtual button. The authorization message as discussed above then can be sent from the device 204 to the fuel application cloud 214 for subsequent processing according to the technique(s) disclosed herein in reference to FIG. 2.

In FIG. 5, the receipt is shown in the display 205 of the device 204. An optional feature of the disclosure is a virtual button labeled "Save Receipt" in this screen for the customer to decide to save the receipt. It is contemplated that the receipt additionally or alternatively can be automatically sent to the customer according to preferences entered by the customer when creating the customer profile in the application. For example, in addition to or in the alternative to the virtual button in FIG. 5, a receipt can be texted, emailed, recorded to the device via the application, or a combination thereof without need for the customer to select to save the receipt for each fueling.

Additional Description

Embodiment 1 is a method for fueling at a gas station, comprising:

receiving, by a cloud computing system, an authorization message for fueling a vehicle from a device of a customer, wherein the authorization message contains a customer identifier unique to the customer, a payment token unique to a payment card or a payment account of the customer and unique to the device, a gas station identifier, and a fuel pump identifier;

sending, by the cloud computing system, a pre-authorization message to a payment provider, wherein the pre-authorization message contains the payment token;

receiving, by the cloud computing system, a pre-authorization confirmation message from the payment provider, wherein the pre-authorization confirmation contains an authorization to use the payment card or the payment account of the customer for payment of the fueling;

sending, by the cloud computing system, a fuel authorization request message to an on-site computer at the gas station via a gateway, wherein the fuel authorization request message contains the customer identifier, the gas station identifier, the fuel pump identifier, and an authorization to pump fuel at a fuel pump at the gas station corresponding to the pump identifier; and in response to receiving the fuel authorization request message, pumping fuel at the fuel pump.

Embodiment 2 is the method of Embodiment 1, wherein pumping fuel at the fuel pump comprises:

sending, by the on-site computer, the fuel authorization request message to a pump controller; and authorizing, by the pump controller, the fuel pump at the gas station to pump fuel at the fuel pump corresponding with the pump identifier.

Embodiment 3 is the method of Embodiment 1 or 2, wherein the fuel authorization request message further contains a request for a receipt.

Embodiment 4 is the method of any of Embodiments 1 to 3, further including determining, by the cloud computing system prior to sending the fuel authorization request message, a discount to a price for fueling the vehicle which is unique to the customer identifier, wherein the fuel authorization request message further includes the discount for the price for fueling the vehicle.

Embodiment 5 is the method of any of Embodiments 1 to 4, further comprising:

sending, by a beacon device, a beacon identifier, the fuel pump identifier, or both to the device of the customer, wherein the device notifies the customer of the fuel pump identifier;

receiving, by a beacon cloud of the cloud computing system, the beacon identifier, the fuel pump identifier, or both from the device of the customer;

associating, by the beacon cloud of the cloud computing system, the beacon identifier, the fuel pump identifier, or both with the gas station identifier; and sending, by the beacon cloud of the cloud computing system, the fuel pump identifier and the gas station identifier to the device of the customer.

Embodiment 6 is the method of any of Embodiments 1 to 5, wherein the gateway is part of the cloud computing system.

Embodiment 7 is the method of any of Embodiments 1 to 6, further comprising:

receiving, by the cloud computing system, a fuel status/receipt message from the on-site computer via the gateway; wherein the fuel status/receipt message includes the customer identifier, an amount owed for the dispensed fuel, the gas station identifier, the fuel pump identifier, and a digital receipt.

Embodiment 8 is the method of Embodiment 7, further comprising:

in response to receiving the fuel status/receipt message, sending, by the cloud computing system, a payment completion message to the payment provider, wherein the payment completion message includes the amount owed for the dispensed fuel.

Embodiment 9 is the method of Embodiment 7, further comprising:

in response to receiving the fuel status/receipt message, sending, by the cloud computing system, a digital receipt to the device of the customer.

Embodiment 10 is the method of any of Embodiments 1 to 9, wherein the cloud computing system comprises a loyalty cloud and a fuel application cloud.

Embodiment 11 is the method of Embodiment 10, wherein the loyalty cloud and the fuel application cloud are separate clouds.

Embodiment 12 is the method of Embodiment 10, wherein the authorization message containing the customer identifier is received by the fuel application cloud from the device of the customer, the method further comprising:

receiving, by the loyalty cloud, the customer identifier from the fuel application cloud;

determining, by the loyalty cloud, a discount to a price for fueling the vehicle; and sending, by the loyalty cloud, the discount to the fuel application cloud.

Embodiment 13 is the method of Embodiment 10, wherein the fuel application cloud performs the steps of receiving an authorization message, sending a pre-authorization message to a payment provider, receiving a pre-authorization confirmation message, and sending a fuel authorization request message to the on-site computer via the gateway.

Embodiment 14 is the method of any of Embodiments 1 to 13, wherein the cloud computing system is networked with the device of the customer via a cellular communication network, a mobile communication network, a satellite communication network, or a combination thereof.

Embodiment 15 is the method of Embodiment 14, wherein the gateway is networked with the on-site computer via a secure internet connection.

Embodiment 16 is the method of any of Embodiments 1 to 15, wherein the on-site computer is networked with a POS controller, and wherein the POS controller is additionally networked with a loyalty app server.

Embodiment 17 is the method of Embodiment 16, further comprising:

sending, by the on-site computer, a fuel status/rewards message to the POS controller;

sending, by the POS controller, the fuel status/rewards message to the loyalty app server; and sending, by the loyalty app server, a rewards message to the cloud computing system.

Embodiment 18 is the method of Embodiment 17, wherein the loyalty app server is networked with the cloud computing system via a secure internet connection, wherein the loyalty app server is networked with the POS controller via a first intranet connection, wherein the on-site computer is networked to the fuel pump via a second intranet connection, wherein the on-site computer and the POS controller are networked via a third intranet connection.

Embodiment 19 is a cloud-assisted fueling system comprising:

a cloud computing system;

wherein the cloud computing system is networked to an on-site computer located at a gas station via a gateway,
wherein the cloud computing system is configured to:
receive an authorization message for fueling a vehicle from a device of a customer, wherein the authorization message contains a customer identifier unique to the customer, a payment token unique to a payment card or a payment account of the customer and unique to the device, a gas station identifier, and a fuel pump identifier;
send a pre-authorization message to a payment provider, wherein the pre-authorization message contains the payment token;
receive a pre-authorization confirmation message from the payment provider, wherein the pre-authorization confirmation contains an authorization to use the payment card or the payment account of the customer for payment of the fueling; and
send a fuel authorization request message to the on-site computer via the gateway, wherein the fuel authorization request message contains the customer identifier, the gas station identifier, the fuel pump identifier, and an authorization to pump fuel at a fuel pump corresponding to the pump identifier.

Embodiment 20 is the system of Embodiment 19, further comprising one or more of: the gas station comprising the fuel pump, a beacon device in proximity of the fuel pump, an on-site computer which controls the fuel pump via a pump controller, and a loyalty app server networked with the on-site computer via a POS controller.

Embodiment 21 is the system of Embodiment 20, optionally one or more of:
wherein in response to receiving the fuel authorization request message, the fuel pump pumps fuel via instruction received from the on-site computer via the pump controller;
wherein the beacon is configured to send a beacon identifier, the fuel pump identifier, or both to the device of the customer;
wherein the cloud computing system receives the beacon identifier, the fuel pump identifier, or both from the device of the customer;
wherein the a beacon cloud of the cloud computing system associates the beacon identifier, the fuel pump identifier, or both with the gas station identifier;
wherein the beacon cloud of the cloud computing system sends the fuel pump identifier and the gas station identifier to the device of the customer; and
wherein the device displays the fuel pump identifier on a display of the device.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for fueling at a gas station, comprising:
receiving, by a cloud computing system, a beacon identifier, a fuel pump identifier, or both from a device of a customer;
associating, by the cloud computing system, the beacon identifier, the fuel pump identifier, or both with a gas station identifier;
sending, by the cloud computing system, the fuel pump identifier and the gas station identifier to the device of the customer;
receiving, by the cloud computing system, an authorization message for fueling a vehicle from the device of the customer, wherein the authorization message contains a customer identifier unique to the customer, a payment token unique to a payment card or a payment account of the customer and unique to the device, the gas station identifier, and the fuel pump identifier; and
sending, by the cloud computing system, a fuel authorization request message to an on-site computer at the gas station via a gateway, wherein the fuel authorization request message contains the customer identifier, the gas station identifier, the fuel pump identifier, and an authorization to pump fuel at a fuel pump at the gas station corresponding to the fuel pump identifier; and
in response to receiving the fuel authorization request message, pumping fuel at the fuel pump.

2. The method of claim 1, wherein pumping fuel at the fuel pump comprises:
sending, by the on-site computer, the fuel authorization request message to a pump controller; and
authorizing, by the pump controller, the fuel pump at the gas station to pump fuel at the fuel pump corresponding with the fuel pump identifier.

3. The method of claim 1,
wherein the fuel authorization request message further contains a request for a receipt.

4. The method of claim 1, further comprising:
sending, by a beacon device, the beacon identifier, the fuel pump identifier, or both to the device of the customer, wherein the device notifies the customer of the fuel pump identifier.

5. The method of claim 1, wherein the gateway is part of the cloud computing system.

6. The method of claim 1, further comprising:
sending, by the cloud computing system, a pre-authorization message to a payment provider, wherein the pre-authorization message contains the payment token; and
receiving, by the cloud computing system, a pre-authorization confirmation message from the payment provider, wherein the pre-authorization confirmation message contains an authorization to use the payment card or the payment account of the customer for payment of the fueling.

7. The method of claim 1, further comprising:
receiving, by the cloud computing system, a fuel status or receipt message from the on-site computer via the gateway; and wherein the fuel status or receipt message includes the customer identifier, an amount owed for dispensed fuel, the gas station identifier, the fuel pump identifier, and a digital receipt.

8. The method of claim 7, further comprising:
in response to receiving the fuel status or receipt message, sending, by the cloud computing system, a payment completion message to a payment provider,
wherein the payment completion message includes the amount owed for dispensed fuel.

9. The method of claim 7, further comprising:
in response to receiving the fuel status or receipt message, sending, by the cloud computing system, a digital receipt to the device of the customer.

10. The method of claim 1, wherein the cloud computing system comprises a loyalty cloud and a fuel application cloud; wherein the loyalty cloud and the fuel application cloud are separate clouds; wherein the authorization message containing the customer identifier is received by the fuel application cloud from the device of the customer, the method further comprising:
receiving, by the loyalty cloud, the customer identifier from the fuel application cloud;
determining, by the loyalty cloud, a discount to a price for fueling the vehicle; and
sending, by the loyalty cloud, the discount to the fuel application cloud.

11. The method of claim 1, wherein the cloud computing system is networked with the device of the customer via a cellular communication network, a mobile communication network, a satellite communication network, or a combination thereof; and wherein the gateway is networked with the on-site computer via a secure internet connection.

12. The method of claim 1, wherein the on-site computer is networked with a point of sale (POS) controller, and wherein the POS controller is additionally networked with a loyalty app server, the method further comprising:
sending, by the on-site computer, a fuel status or rewards message to the POS controller;
sending, by the POS controller, the fuel status or rewards message to the loyalty app server; and
sending, by the loyalty app server, a rewards message to the cloud computing system.

13. The method of claim 12, wherein the loyalty app server is networked with the cloud computing system via a secure internet connection, wherein the loyalty app server is networked with the POS controller via a first intranet connection, wherein the on-site computer is networked to the fuel pump via a second intranet connection, wherein the on-site computer and the POS controller are networked via a third intranet connection.

14. A cloud-assisted fueling system comprising:
a cloud computing system;
wherein the cloud computing system is networked to an on-site computer located at a gas station via a gateway, wherein the cloud computing system is configured to:
receive a beacon identifier, a fuel pump identifier, or both from a device of a customer;
associate the beacon identifier, the fuel pump identifier, or both with a gas station identifier;
send the fuel pump identifier and the gas station identifier to the device of the customer;
receive an authorization message for fueling a vehicle from the device of the customer, wherein the authorization message contains a customer identifier unique to the customer, a payment token unique to a payment card or a payment account of the customer and unique to the device, the gas station identifier, and the fuel pump identifier; and
send a fuel authorization request message to the on-site computer via the gateway, wherein the fuel authorization request message contains the customer identifier, the gas station identifier, the fuel pump identifier, and an authorization to pump fuel at a fuel pump corresponding to the fuel pump identifier.

15. The system of claim 14, wherein the cloud computing system is further configured to:
send a pre-authorization message to a payment provider, wherein the pre-authorization message contains the payment token; and
receive a pre-authorization confirmation message from the payment provider, wherein the pre-authorization confirmation message contains an authorization to use the payment card or the payment account of the customer for payment of the fueling.

16. The system of claim 14, further comprising:
the gas station comprising a beacon device in proximity of the fuel pump, wherein the beacon device is configured to send the beacon identifier, the fuel pump identifier, or both to the device of the customer.

17. The system of claim 14, further comprising:
the gas station comprising the on-site computer networked with a point of sale (POS) controller, wherein the on-site computer is configured to control the fuel pump via a pump controller and to send a fuel status or rewards message to the POS controller.

18. The system of claim 17, further comprising:
the gas station comprising a loyalty app server networked with the on-site computer via the POS controller, wherein the POS controller is configured to send the fuel status or rewards message to the loyalty app server.

19. The system of claim 17, further comprising:
the gas station comprising the fuel pump, wherein in response to receiving the fuel authorization request message, the fuel pump pumps fuel via instruction received from the on-site computer via the pump controller.

20. The system of claim 14, wherein the device is configured to display the fuel pump identifier on a display of the device.

* * * * *